Dec. 15, 1925.

T. F. BUCK

AUTOMOBILE BUMPER

Filed Feb. 25, 1925      3 Sheets-Sheet 1

1,565,785

Inventor
Thomas F. Buck
By John Milton Jester
Attorney

Dec. 15, 1925.  1,565,785

T. F. BUCK

AUTOMOBILE BUMPER

Filed Feb. 25, 1925  3 Sheets-Sheet 2

Inventor
Thomas F. Buck
By John Milton Jester
Attorney

Patented Dec. 15, 1925.

1,565,785

UNITED STATES PATENT OFFICE.

THOMAS F. BUCK, OF NEW CASTLE, PENNSYLVANIA.

AUTOMOBILE BUMPER.

Application filed February 25, 1925. Serial No. 11,522.

*To all whom it may concern:*

Be it known that I, THOMAS F. BUCK, a citizen of the United States, residing at New Castle, in the county of Lawrence and State of Pennsylvania, have invented certain new and useful Improvements in Automobile Bumpers, of which the following is a specification.

This invention relates to safety appliances, particularly to safety attachments for the front or rear of an automobile, and has for its object the provision of a novel bumper adapted to be secured upon the forward or rear ends of the frame bars of the chassis whereby to protect the car from or against injury in the event of a collision.

An important object is the provision of a device of this character in which the bumper proper can be adjusted with respect to the end of the frame so that the device may be used on different cars or be positioned properly depending upon whether the tires are of the ordinary type, over-size, or of the balloon type.

Another object is the provision of a device of this character in which the bumper proper can be readily removed from the car should it be desirable in case of accident or for any other reason.

Yet another object is the provision of a bumper structure so constructed and arranged as to be capable of folding into a small space for facilitating packing for shipment or storage.

An additional object is the provision of a bumper which will be simple and inexpensive in manufacture, easy to install, efficient and durable in service, and a general improvement in the art.

With the above and other objects and advantages in view, the invention consists in the combination and arrangement of parts to be hereinafter more fully described and claimed and illustrated in the accompanying drawings in which:

Figure 1:
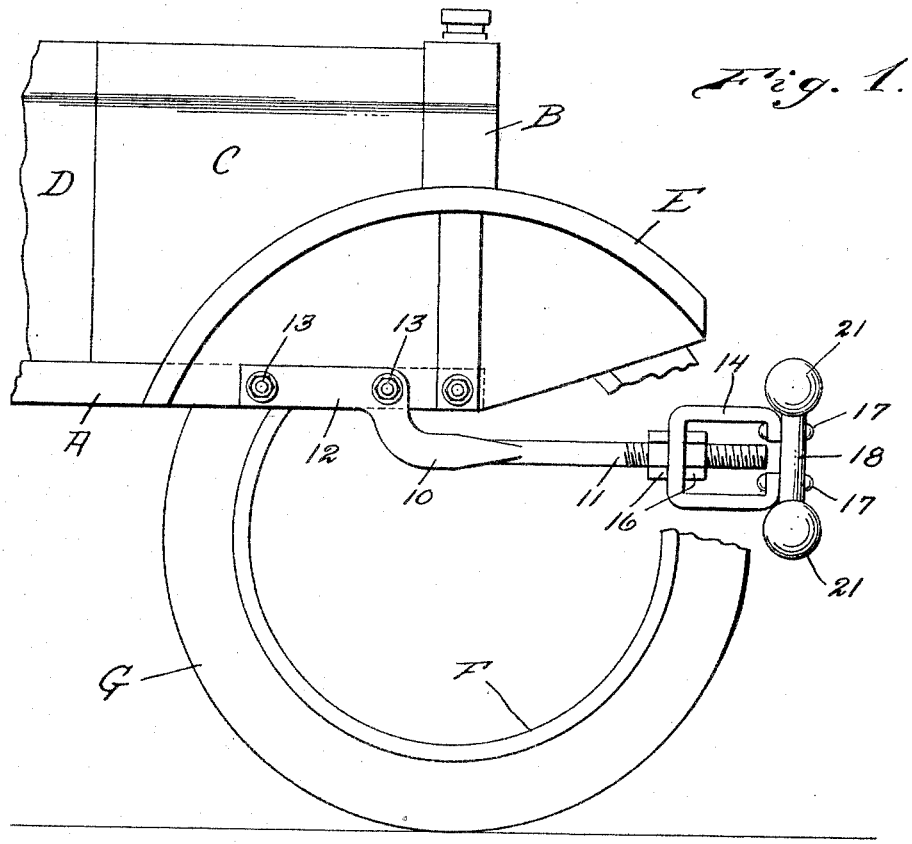
Figure 1 is a side elevation of an automobile equipped with my bumper, portions being broken away and in section.

Referring more particularly to the drawings, the letter A designates the frame bars of the chassis of an automobile, B represents the radiator, C the hood, D a portion of the body, E the fenders, and F the wheels carrying tires G.

In carrying out my invention I provide a pair of supporting arms 10 which might be formed tubular or solid, as preferred and as a casting, forging or even possibly a stamping. These arms have cylindrical and threaded forward portions 11 and flattened rear portions 12 disposed against the frame bars A and secured thereto as by means of the bolts 13 or other equivalent fastening elements. In the present instance these arms are represented as being offset downwardly at their intermediate points, though this is a minor detail as the shape may be varied within wide limits.

Carried by the forward ends of the arms 10 are substantially U-shaped yokes 14 which have their bright portions formed with holes 15 for the passage of the threaded ends 11 of the arms, and these yokes are held in position by nuts 16. Each arm carries two nuts, one within and one at the rear of the yoke.

Secured to the forward ends of the yokes, as for instance by welding or by the rivets disclosed at 17, are uprights 18 which may be solid or tubular, as preferred, and which have threaded ends screwed into T's 19. Slidably engaged through the T's are upper and lower transverse members 20 which may be tubular or solid, as preferred, and which have ball heads 21 screwed thereonto for the purpose of avoiding sharp corners or ends and for the additional purpose of making an ornamental or attractive finish. The ends of the uprights 18 are intended to bear and bite against the transverse members 20 for preventing them from shifting accidentally.

The upper transverse member 20 makes a very effective support for the license plate 22 and holding means may consist merely of a number of clamps or clips 23 embracingly engaging the upper member 20 and bolted or otherwise secured at 24 to the license plate.

In installing the device, it will be seen that owing to the slidability of the members 20 through the T's 19 the arms 10 may be disposed at different distances apart depending upon the width of the frame of the car and it is also apparent that in case of necessity the balls 21 at one end of the members 20 may be removed to permit the members 20 to be slid along and disengaged from the T's.

Figure 4:
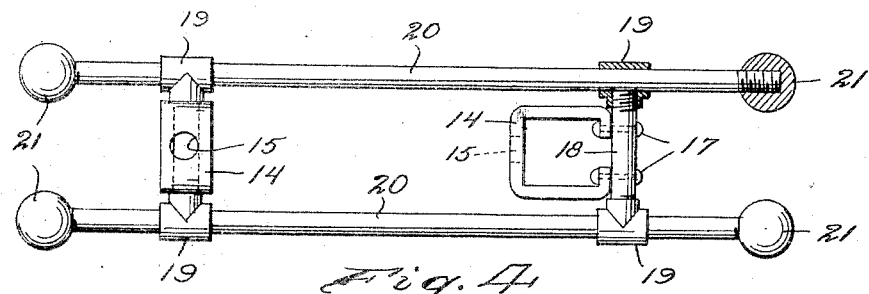
Figure 4 is an elevation of the bumper proper detached from its supporting arms and showing one of the upright members swung.
Figure 3:
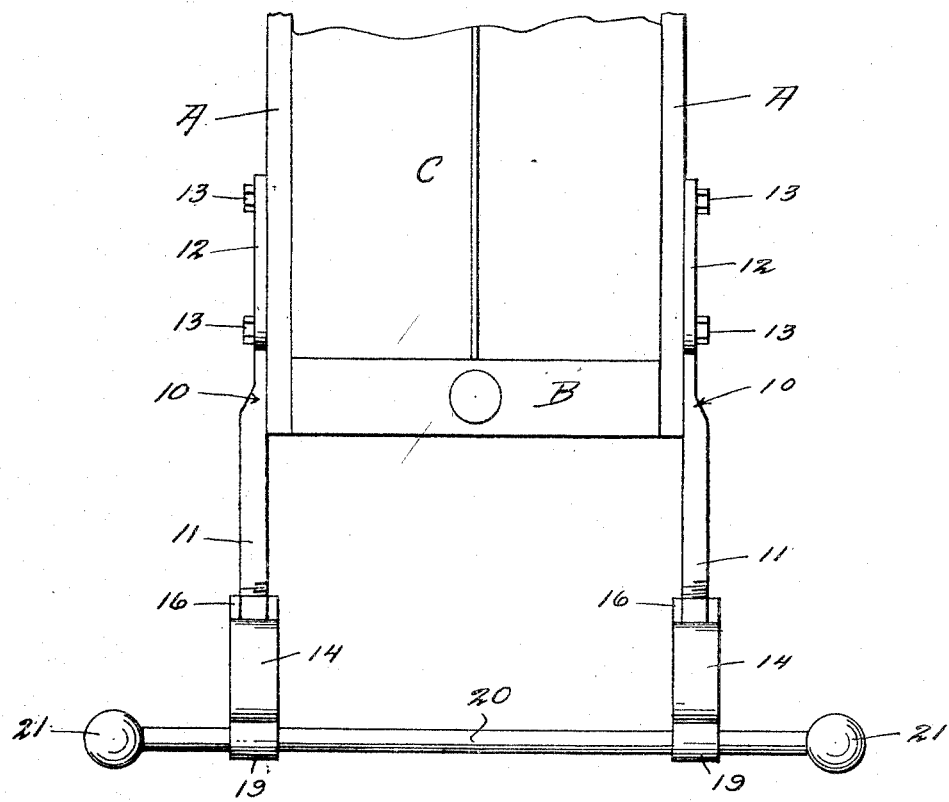
Figure 3 is a plan view.
Figure 5:
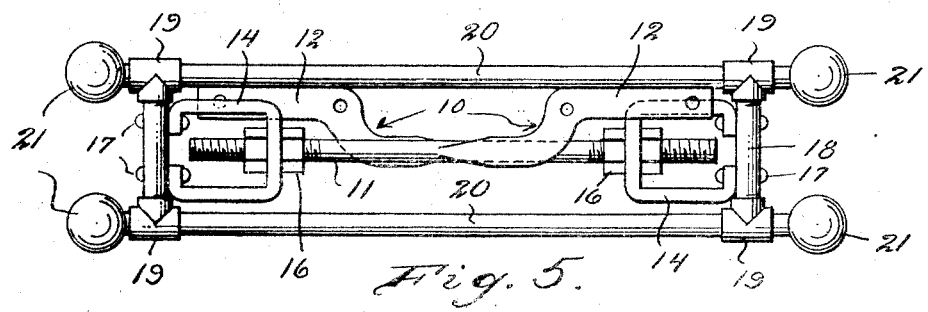
Figure 5 is a front elevation of the bumper detached from the car and folded into small space.

When the device is detached from the car by removing the bolts 13, it is evident that the uprights 18 may be turned with respect to the T's 19, as shown in Figures 4 and 5, and the T's slid outwardly toward the ball heads so that the arms 10 and yokes 14 may be disposed within the space defined by the members 20 and uprights 18. Obviously, this will be of great advantage in transportation or storage as the maximum compactness is thus attained.

Figure 6:
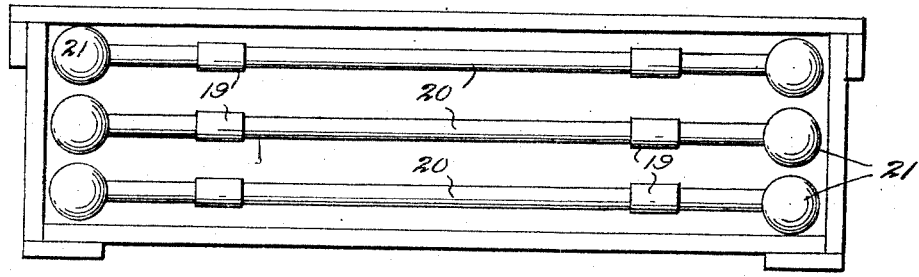
Figure 6 is a plan view of a shipping case showing a plurality of bumpers therein.
Figure 2:
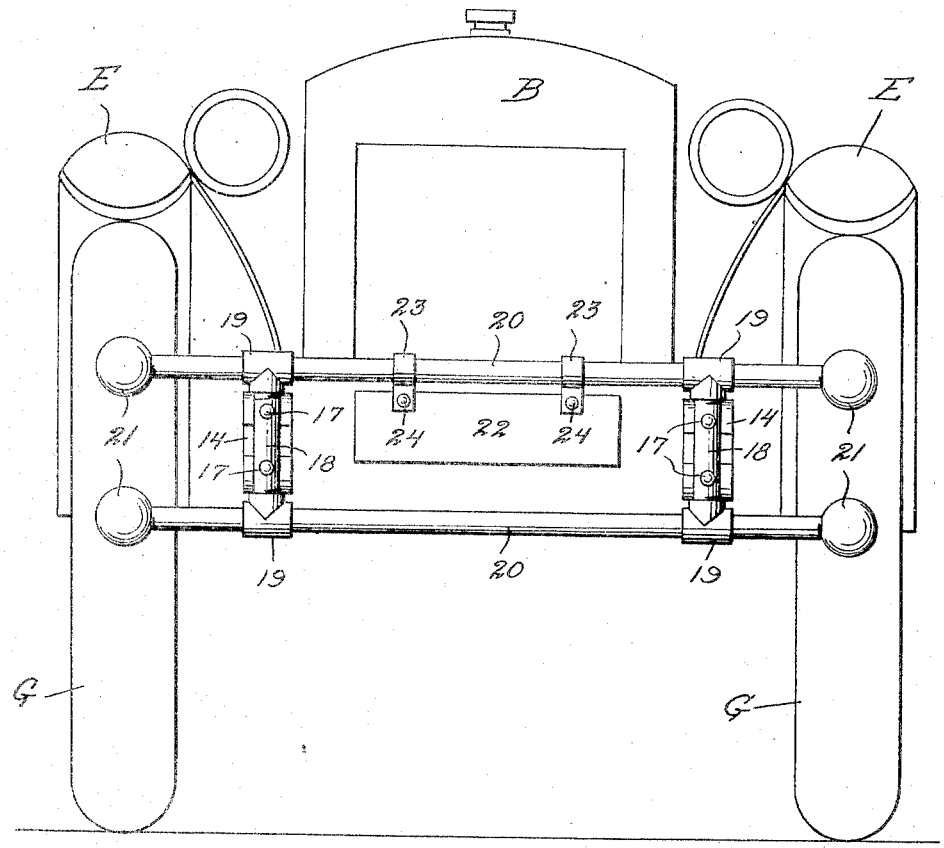
Figure 2 is a front elevation.

Figure 6 illustrates the manner in which several of these bumpers may, when folded as described, be arranged within a comparatively small box or case.

While I have shown and described the preferred embodiment of my invention, it is of course to be understood that I reserve the right to make such changes in the form, construction and arrangement of parts as will not depart from the spirit of the invention or the scope of the subjoined claims.

I claim:

1. A bumper for motor vehicles comprising a pair of arms adapted to be secured to the frame bars, U-shaped yokes carried by the forward ends of said arms, uprights carried by the yokes, and transverse members carried by the uprights.

2. A bumper for motor vehicles, comprising a pair of arms adapted to be secured to the frame bars, U-shaped yokes carried by the forward ends of said arms, uprights carried by the yokes, and transverse members carried by the uprights and slidable with respect thereto.

3. A bumper for motor vehicles comprising a pair of arms adapted to be secured to the frame bars, yokes carried by the forward ends of said arms, uprights carried by the yokes, and transverse members carried by the uprights, said transverse members being arranged in advance of the wheels, and means for adjusting the yokes upon the arms for varying the position of the transverse members depending upon the size of the tires on the wheels.

4. A bumper structure comprising a pair of arms adapted to be secured upon the frame bars of a vehicle, the free ends of said arms being threaded, yokes disposed on said arms and carrying a bumper proper, and nuts on the threaded ends of the arms engaging the yokes for holding the latter in adjusted position.

5. A bumper structure comprising a pair of arms adapted to be secured on the frame bars of a vehicle, yokes adjustably mounted on said arms, uprights secured to the yokes, T's threaded upon the ends of the uprights, and transverse members slidably engaged through the T's and located in advance of the vehicle wheels.

6. A bumper structure comprising a pair of arms adapted to be secured on the frame bars of a vehicle, yokes adjustably mounted on said arms, uprights secured to the yokes, T's threaded upon the ends of the uprights, and transverse members slidably engaged through the T's and located in advance of the vehicle wheels, the ends of the uprights biting against the transverse members for normally holding them stationary.

7. A bumper structure comprising a pair of arms adapted to be secured on the frame bars of a vehicle, yokes adjustably mounted on said arms, uprights secured to the yokes, T's threaded upon the ends of the uprights, and transverse members slidably engaged through the T's and located in advance of the vehicle wheels, the ends of the uprights biting against the transverse members for normally holding them stationary, and the upright members being rotatable with respect to the T's whereby the yokes and arms may be swung to extend within the space defined by the uprights and transverse members.

8. A bumper structure for vehicles comprising a pair of arms adapted to be secured to the vehicle frame bars, the forward ends of said arms being threaded, U-shaped yoke members having their bight portions apertured for engagement upon the threaded ends of the arms, a bumper proper secured to the yokes, and a pair of nuts engaged on the threaded end of each arm, the nuts engaging against the front and back of the bight portion of the yoke.

9. In a bumper structure for vehicles, arms adapted to be secured to the vehicle frame bars, yoke members detachably connected with said arms, uprights secured to said yokes, guide members carried by the uprights and rotatable with respect thereto, and transverse elements extending through said guide members.

10. In a bumper structure for vehicles, arms adapted to be secured to the vehicle frame bars, yoke members detachably connected with said arms, uprights secured to said yokes, guide members carried by the uprights and rotatable with respect thereto, and transverse elements extending through said guide members and slidable with respect thereto, the uprights and yokes together with the arms being swingable to lie within the space defined by the uprights and transverse members.

11. In a bumper structure for vehicles, arms adapted to be secured to the vehicle frame, yokes detachably and adjustably connected with said arms, uprights carried by the yokes, guide members carried by the uprights, and elongated transverse members slidably adjustably engaged through the guide members.

12. In a bumper structure for vehicles, arms adapted to be secured to the vehicle frame, yokes detachably and adjustably connected with said arms, uprights carried by the yokes, guide members carried by the uprights, and elongated transverse members slidably adjustably engaged through the guide members, the uprights together with the yokes and arms being rotatable with respect to the guide members.

In testimony whereof I hereunto affix my signature.

THOMAS F. BUCK.